United States Patent
Lee et al.

(10) Patent No.: US 10,243,208 B2
(45) Date of Patent: Mar. 26, 2019

(54) PRECURSOR OF ELECTRODE ACTIVE MATERIAL COATED WITH METAL AND METHOD OF PREPARING THE SAME

(71) Applicant: LG Chem, Ltd., Seoul (KR)

(72) Inventors: Dae Jin Lee, Daejeon (KR); Joo Hong Jin, Daejeon (KR); Woo Yeon Kong, Daejeon (KR); Sun Sik Shin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 633 days.

(21) Appl. No.: 14/440,194

(22) PCT Filed: Nov. 26, 2013

(86) PCT No.: PCT/KR2013/010794
§ 371 (c)(1),
(2) Date: May 1, 2015

(87) PCT Pub. No.: WO2014/081269
PCT Pub. Date: May 30, 2014

(65) Prior Publication Data
US 2015/0280225 A1  Oct. 1, 2015

(30) Foreign Application Priority Data
Nov. 26, 2012  (KR) .................. 10-2012-0134343

(51) Int. Cl.
*H01M 4/36* (2006.01)
*H01M 4/505* (2010.01)
(Continued)

(52) U.S. Cl.
CPC .......... *H01M 4/366* (2013.01); *C01G 53/006* (2013.01); *H01M 4/505* (2013.01); *H01M 4/525* (2013.01);
(Continued)

(58) Field of Classification Search
CPC ............... H01M 4/366; H01M 10/049; H01M 10/0525; H01M 4/505; H01M 4/525; H01M 4/587; C01G 53/006
See application file for complete search history.

(56) References Cited

U.S. PATENT DOCUMENTS 7,682,739 B2   3/2010 Honda et al.
2003/0211235 A1  11/2003 Suh et al.
(Continued)

FOREIGN PATENT DOCUMENTS

CN   1540037 A   10/2004
EP   2261176 A1  12/2010
(Continued)

OTHER PUBLICATIONS

International Search Report for Application No. PCT/KR2013/010794 dated Mar. 12, 2014.
(Continued)

*Primary Examiner* — Lisa S Park
(74) *Attorney, Agent, or Firm* — Lerner, David, Littenberg, Krumholz & Mentlik, LLP

(57) ABSTRACT

Disclosed are a precursor of an electrode active material for a lithium secondary battery, in which a metal material ionizable through electrolytic decomposition is uniformly coated on a surface of a primary precursor formed of a transition metal hydrate, and a method of preparing the same.

10 Claims, 2 Drawing Sheets

(51) Int. Cl.
  *H01M 4/525*       (2010.01)
  *H01M 10/04*       (2006.01)
  *H01M 10/0525*     (2010.01)
  *C01G 53/00*       (2006.01)
  *H01M 4/587*       (2010.01)

(52) U.S. Cl.
  CPC ..... *H01M 10/049* (2013.01); *H01M 10/0525* (2013.01); *H01M 4/587* (2013.01)

(56) References Cited

U.S. PATENT DOCUMENTS

| | | |
|---|---|---|
| 2004/0188247 A1 | 9/2004 | Hardee |
| 2005/0235776 A1 | 10/2005 | He et al. |
| 2007/0298512 A1 | 12/2007 | Park et al. |
| 2008/0087137 A1 | 4/2008 | Shim et al. |
| 2010/0119947 A1* | 5/2010 | Lee .................... H01M 4/0471 429/231.95 |
| 2012/0040246 A1 | 2/2012 | Sakai et al. |
| 2012/0043499 A1 | 2/2012 | Shin et al. |
| 2013/0175469 A1* | 7/2013 | Paulsen .............. C01G 45/1221 252/182.1 |

FOREIGN PATENT DOCUMENTS

| | | |
|---|---|---|
| JP | H11-7954 A | 1/1999 |
| JP | H11340482 A | 12/1999 |
| JP | 2000012026 | 7/2001 |
| JP | 2003-321702 A | 11/2003 |
| JP | 2003331845 A | 11/2003 |
| JP | 2007533862 A | 11/2007 |
| JP | 2008013846 A | 1/2008 |
| JP | 2008138268 A | 6/2008 |
| JP | 2011516384 A | 5/2011 |
| JP | 2012147014 A | 8/2012 |
| KR | 20030088247 A | 11/2003 |
| KR | 100813014 B1 | 3/2008 |
| KR | 20100056106 A | 5/2010 |
| KR | 20100070181 A | 6/2010 |
| WO | 2012071287 A1 | 5/2012 |
| WO | 2012174235 A1 | 12/2012 |

OTHER PUBLICATIONS

Search Report from European Application No. 13856813.4, dated Feb. 24, 2016.

* cited by examiner

[FIG. 1]
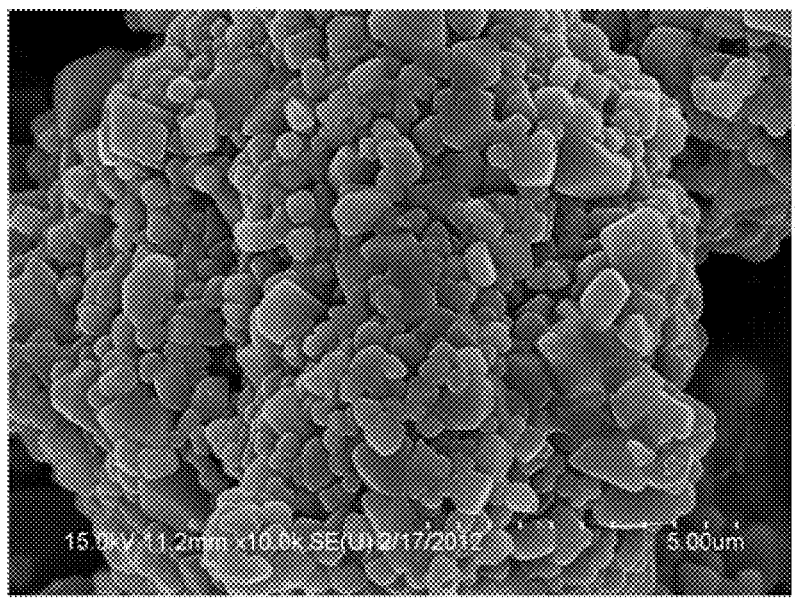

[FIG. 2]
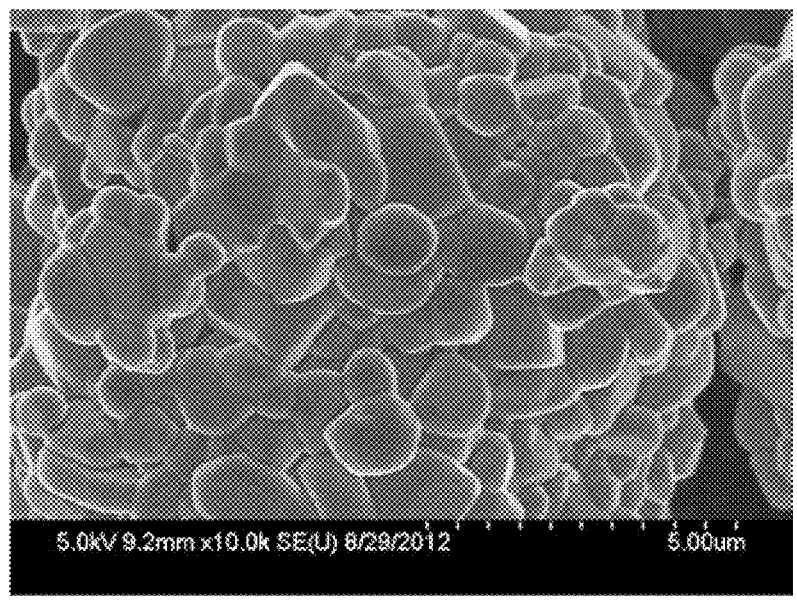
[FIG. 3]
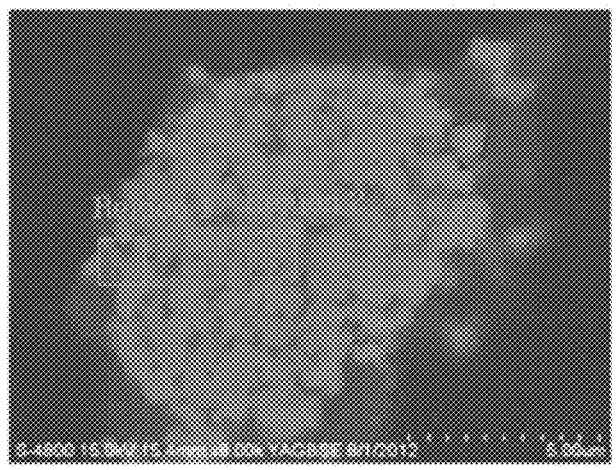

PRECURSOR OF ELECTRODE ACTIVE MATERIAL COATED WITH METAL AND METHOD OF PREPARING THE SAME

CROSS-REFERENCE TO RELATED APPLICATION

This application is a national phase entry under 35 U.S.C. § 371 of International Application No. PCT/KR2013/010794, filed Nov. 26, 2013, which claims priority to Korean Patent Application No. 10-2012-0134343, filed Nov. 26, 2012, the disclosures of which are incorporated herein by reference.

TECHNICAL FIELD

The present invention relates to a precursor of an electrode active material coated with a metal and a method of preparing the same. More particularly, the present invention relates to a precursor of an electrode active material for a lithium secondary battery, in which a metal material that is ionizable through electrolytic decomposition is uniformly coated on a surface of a primary precursor formed of a transition metal hydrate and a method of preparing the same.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, has been underway and such lithium secondary batteries are commercially available and widely used. Lithium secondary batteries have long electrode lifespan and excellent high-speed charge and discharge efficiency and thus are used most widely.

In general, a lithium secondary battery has a structure in which an electrode assembly, which includes: a cathode including a lithium transition metal oxide as an electrode active material; an anode including a carbon-based active material; and a polyolefin-based porous separator disposed between the cathode and the anode, is impregnated with a lithium salt-containing non-aqueous electrolyte, such as $LiPF_6$ or the like.

In this regard, a lithium cobalt-based oxide, a lithium manganese-based oxide, a lithium nickel-based oxide, a lithium composite oxide, and the like are mainly used as cathode active materials, and a carbon-based material is mainly used as an anode active material. Lithium ions of a cathode active material are deintercalated and then intercalated into a carbon layer of an anode during charge, the lithium ions of the carbon layer are deintercalated and then intercalated into the cathode active material during discharge, and a non-aqueous electrolyte serves as a medium through which lithium ions migrate between the anode and the cathode. Such lithium secondary batteries basically require stability within operating voltage ranges of a battery and the ability to transfer ions at a sufficiently rapid rate.

However, in secondary batteries using a fluorine (F)-containing electrolyte and a carbon material as an anode active material, as a charge and discharge process progresses, metal components of a cathode active material are eluted into an electrolyte and lithium is deposited onto a surface of a carbon material and, accordingly, the electrolyte decomposes at the carbon material. Such deposition of metal components and decomposition of an electrolyte more severely occur when a secondary battery is stored at high temperature, which results in reduction in battery remaining capacity and recovery capacity.

Meanwhile, a lithium transition metal oxide used as a cathode active material has low electrical conductivity, and reaction between the lithium transition metal oxide and an electrolyte is accelerated at high temperature, generating a by-product that increases resistance of a cathode, which results in drastic reduction in storage lifespan at high temperature.

To address these problems of a cathode and an anode, the related art discloses a technology for coating or treating a surface of a cathode or anode active material with a predetermined material.

For example, Japanese Patent Application Laid-open No. 2000-12026 discloses a method of coating an oxide of a metal such as Ni, Co, Cu, Mo, W, or the like on a surface of a carbon-based anode active material. In addition, as a method of coating a cathode active material with a conductive material to reduce resistance of a contact interface between the cathode active material and an electrolyte or a by-product generated at high temperature, a method of coating a cathode active material with a conductive polymer is known.

In addition, Korean Patent Application Publication No. 2003-0088247 discloses a method of preparing a cathode active material for a lithium secondary battery, including: (a) surface-treating a metal-containing source by adding the metal-containing source to a doping element-containing coating solution (wherein the metal-containing source is a material containing a metal selected from the group consisting of cobalt, manganese, nickel, and combinations thereof and excluding lithium); (b) preparing an active material precursor by drying the surface-treated metal-containing source; and (c) mixing the active material precursor and the lithium-containing source and heat-treating the resulting mixture.

However, a water-soluble material cannot be used in coating of a calcined electrode active material and, when an oxide is used, it is difficult to smoothly coat an already synthesized material with the oxide.

The related art discloses coating with OH groups, but it is difficult to form a uniform film using this method, and only restrictive materials in accordance with pH and the like may be used and thus there is limitation in coating composition.

Therefore, there is a high need to develop a technology that may fundamentally address these problems.

DISCLOSURE

Technical Problem

Therefore, the present invention has been made to solve the above problems and other technical problems that have yet to be resolved.

As a result of a variety of intensive studies and various experiments, the inventors of the present invention discovered that, when coating a metal material on a primary precursor formed of a transition metal hydrate through electrolytic decomposition, the coating material does not permeate the inside of the primary precursor and forms a uniform film on a surface thereof in an electrode active material synthesis process, thus completing the present invention.

Therefore, it is an object of the present invention to provide an electrode active material precursor uniformly coated with a metal material through electrolytic decomposition and a method of preparing the same.

Technical Solution

In accordance with one aspect of the present invention, provided is a precursor of an electrode active material for a lithium secondary battery, in which a metal material that is ionizable through electrolytic decomposition is uniformly coated on a surface of a primary precursor formed of a transition metal hydrate.

In one specific embodiment, the electrolytic decomposition may be implemented such that the metal material is ionized in an aqueous acid solution, forming an intermediate, followed by reduction.

In particular, when electricity is applied between positive (+) and negative (−) electrode plates using a metal material to be coated, in a state of being immersed in an aqueous acid solution such as an aqueous sulfuric acid solution or the like, a metal of the metal material receives electrons to be ionized into a metal ion at the positive (+) electrode, the metal ion reacts with sulfuric acid ions of the aqueous sulfuric acid solution to form a metal salt as an intermediate, and the metal salt receives electrons from the negative (−) electrode to be reduced into the metal. The metal obtained by reduction is adsorbed onto primary precursor particles and, accordingly, the metal may be coated on the primary precursor particles.

The intermediate formed in the electrolytic decomposition process may, in particular, be a metal salt, for example, a sulfate or a nitrate, but embodiments of the present invention are not limited thereto. That is, various materials in the form of acid salts may be used.

When coating the primary precursor through electrolytic decomposition as described above, a metal form is coated on the primary precursor and thus has a different synthesis temperature than —OH or —OOH and, accordingly, the metal form does not permeate the inside of the primary precursor even through a subsequent calcination process and forms a surface different than the inside thereof, whereby a uniform film may be formed.

In addition, electrolytically decomposable metals are not affected by pH and the like and thus coating of various metal compositions is possible. In one specific embodiment, the metal material may be a material containing at least one element selected from the group consisting of an electrolytically decomposable transition metal, P, and Al. In particular, the transition metal may be at least one element selected from the group consisting of Ni, Co, Mn, Fe, Sn, Mo, Nd, Zr, and Zn.

However, when coating a metal material having high oxidation potential, such as Mn, electrolytic decomposition is not easy to implement and an oxide such as $MnO_2$ is produced and thus desired resulting products may not be obtained. Thus, in one specific embodiment, the electrolytic decomposition may be performed using a catalyst. In particular, the catalyst may be at least one selected from the group consisting of a $ZnCl_2$-based catalyst, a $CoCl_2$-based catalyst, a $MnCl_2$-based catalyst, a $NiCl_2$-based catalyst, and a $SnCl_2$-based catalyst. More particularly, a $ZnCl_2$-based catalyst may be used.

In one specific embodiment, a coating thickness of the metal material may be 0.1 μm to 1 μm. When the coating thickness is less than 0.1 μm, it may be difficult to achieve uniform coating and desired effects such as desired electrical conductivity and the like through metal coating may not be obtained. On the other hand, intercalation and deintercalation of lithium ions may be interfered with if the coating thickness exceeds 1 μm.

In addition, the amount of the metal material may be 0.01% to 5% based on a total weight of the precursor of the electrode active material. The metal material may be completely or partially coated on the surface of the primary precursor. Preferably, the metal material may be completely coated on the surface of the primary precursor.

When the amount of the metal material is less than 0.01% based on the total weight of the precursor of the electrode active material, problems occurring due to reaction between a cathode active material and an electrolyte may not be prevented and excellent electrical conductivity may not be obtained. When the amount of the metal material exceeds 5%, the amount of the electrode active material relatively decreases and thus capacity may be reduced.

In one specific embodiment, the primary precursor may be a material represented by Formula 1 below:

$$M(OH_{1-z})_2 \qquad (1)$$

Wherein 0.4≤z<1, M may include, as a main component, at least one element selected from the group consisting of Ni, Mn, Co, Al, Mg, Ti, and Fe, in which a molar fraction of M may, for example, be 80 mol % based on the total elements.

In one specific embodiment, M may be $Ni_aMn_bMe_c$, wherein a+b≤1, 0.3≤a≤0.9, 0.1≤b≤0.8, 0≤c≤0.2, and Me may be at least one element selected from the group consisting of Co, Al, Mg, Ti, Sr, Zn, B, Ca, Cr, Si, Ga, Sn, P, V, Sb, Nb, Ta, Mo, W, Zr, Y, and Fe. In particular, M may be a three component-based material of $Ni_aMn_bMe_c$ where Me is Co.

That is, the primary precursor may be in the form of a hydrate of a transition metal oxide precursor having a molar fraction of Ni of 30% to 90% and containing Mn and a predetermined metal element (Me). Such a composite transition metal oxide precursor may be more suitable for use in preparation of an electrode active material for a lithium secondary battery with high capacity and excellent structural stability than a transition metal oxide precursor consisting of a single element.

In addition, when the metal material is coated on the primary precursor through electrolytic decomposition, damage to a surface of an electrode active material that may occur when a water-soluble solution is used may be prevented and Li loss such as charge transfer or the like of an electrode active material that may occur during electrolytic decomposition may be reduced, when compared to a case in which a cathode active material is prepared and then the cathode active material is coated through electrolytic decomposition.

The present invention also provides a method of preparing the precursor of an electrode active material, including:

(i) preparing a primary precursor in the form of a hydrate;

(ii) coating the primary precursor with a metal material through electrolytic decomposition; and (iii) drying the coated primary precursor.

In the process (i), the primary precursor may be prepared by mixing a transition metal source and a solvent. For example, the transition metal source may be at least one of a nickel source, a cobalt source, and a manganese source, but embodiments of the present invention are not limited thereto. That is, in preparation of the primary precursor, the transition metal source may be further added.

The solvent may be water, ethanol, methanol, or a combination thereof.

The nickel source may be nickel sulfate, nickel nitrate, nickel acetate, nickel chloride, nickel phosphate, or a combination thereof. The cobalt source may be cobalt sulfate, cobalt nitrate, cobalt acetate, cobalt chloride, cobalt phosphate, or a combination thereof. The manganese source may be manganese sulfate, manganese nitrate, manganese acetate, manganese chloride, manganese phosphate, or a combination thereof.

The transition metal source may be a sulfur oxide of a transition metal, a nitric oxide of a transition metal, an acetic oxide of a transition metal, a chloride of a transition metal, a phosphorus oxide of a transition metal, or a combination thereof.

The present invention also provides an electrode active material prepared by mixing the precursor of an electrode active material and a lithium precursor and heat-treating the resulting mixture.

In one specific embodiment, the lithium precursor may be at least one selected from the group consisting of LiOH and $Li_2CO_3$.

In this regard, heat treatment temperature and atmosphere may be set as conditions known in the art.

The electrode active material may, for example, be a cathode active material or an anode active material. More particularly, the electrode active material may be a cathode active material.

For example, the electrode active material may be a cathode active material formed by coating the metal material on a compound, for example, a layered compound such as lithium nickel manganese composite oxide (LNMO), lithium cobalt oxide ($LiCoO_2$), lithium nickel oxide ($LiNiO_2$), or the like or a compound substituted with one or more transition metals; a lithium manganese oxide having the formula $Li_{1+x}Mn_{2-x}O_4$ where $0 \leq x \leq 0.33$, such as $LiMnO_3$, $LiMn_2O_3$, $LiMnO_2$, or the like; lithium copper oxide ($Li_2CuO_2$); a vanadium oxide such as $LiV_3O_8$, $LiV_3O_4$, $V_2O_5$, $Cu_2V_2O_7$, or the like; an Ni-site type lithium nickel oxide of Formula $LiNi_{1-x}M_xO_2$ where M=Co, Mn, Al, Cu, Fe, Mg, B, or Ga, and $0.01 \leq x \leq 0.3$; a lithium manganese composite oxide of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; $Fe_2(MoO_4)_3$; or the like. In another embodiment, the electrode active material may be an anode active material formed by coating the metal material on a compound, for example, a metal composite oxide such as $Li_xFe_2O_3$ where $0 \leq x \leq 1$, $Li_xWO_3$ where $0 \leq x \leq 1$, $Sn_xMe_{1-x}Me'_yO_z$ where Me: Mn, Fe, Pb, or Ge; Me': Al, B, P, Si, a Group I, II or III element, a halogen; $0 \leq x \leq 1$; $1 \leq y \leq 3$; and $1 \leq z \leq 8$; a Li—Co—Ni-based material; or the like.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a scanning electron microscope (SEM) image of a cathode active material prepared according to Example 1;

FIG. 2 is an SEM image of a cathode active material prepared according to Comparative Example 1; and FIG. 3 is an SEM cross-sectional image of the cathode active material of Example 1.

BEST MODE

Now, the present invention will be described in more detail with reference to the following examples. These examples are provided only for illustration of the present invention and should not be construed as limiting the scope and spirit of the present invention.

Example 1

A metal hydroxide, $M(OH_{0.6})_2$ where $M=Ni_{0.6}Mn_{0.2}Co_{0.2}$, as a primary precursor formed of a transition metal hydrate and Co as a metal material were prepared, the metal hydroxide was coated with 3 wt % of Co through electrolytic decomposition, and the coated metal hydroxide was sintered at a temperature of 890° C. to 930° C. for 10 hours in air, thereby completing preparation of a Co-coated cathode active material.

Comparative Example 1

A metal hydroxide, $M(OH_{0.6})_2$ where $M=Ni_{0.6}Mn_{0.2}Co_{0.2}$, as a primary precursor was calcined without plating through electrolysis to prepare $LiNi_{0.6}Mn_{0.2}Co_{0.2}O_2$ as a cathode active material for lithium secondary batteries.

Experimental Example 1

Observation of Prepared Cathode Active Materials Using SEM and EDX Analysis Thereof The Ni-based cathode active materials prepared according to Example 1 and Comparative Example 1 were observed using a scanning electron microscope (SEM) and observation results are shown in FIGS. 1 and 2. In addition, energy-dispersive X-ray spectroscopy (EDX) analysis results of the cathode active material of Example 1 are shown in Table 1 below, and Region 1 and Region 2 shown in Table 1 are illustrated in the SEM cross-sectional image of the cathode active material of Example 1 of FIG. 3.

TABLE 1

| Weight % | Mn | Co | Ni |
|---|---|---|---|
| Region 1 | 14.8 | 25.1 | 60.2 |
| Region 2 | 16.8 | 22.4 | 60.8 |

Referring to FIG. 1, it can be confirmed that Co is smoothly coated on a surface of the lithium nickel cobalt manganese oxide of Example 1. In addition, referring to FIG. 3 and Table 1, it can be confirmed that the amount of Co on the surface of the cathode active material is greater than that inside the cathode active material. This is because Co and the primary precursor inside the cathode active material have different synthesis temperatures and thus, even after calcination, Co does not permeate into the primary precursor, but forms a surface different than the inside thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in a precursor of an electrode active material according to the present invention, even though a primary precursor coated with a metal material is subjected to a subsequent synthesis process, the coating material does not permeate the inside of the electrode active material, but remains on a surface thereof, thereby forming a uniform metal coated film. In addition, the precursor of the electrode active material may be coated with various metals.

In addition, according to a method of preparing the precursor of an electrode active material, a large amount of a primary precursor may be coated with a uniform amount of a metal material and may be coated with materials that cannot be coated through co-precipitation.

The invention claimed is:

1. A method of preparing a precursor of an electrode material for a lithium secondary battery, comprising: preparing a primary precursor in the form of a hydrate; coating the primary precursor with a material through electrolytic decomposition; and drying the coated primary precursor, wherein the material is uniformly coated on a surface of the primary precursor, and the material comprises an electrolytically decomposable transition metal, P, or Al, wherein the electrolytically decomposable transition metal is at least one element selected from the group consisting of Ni, Co, Mn, Fe, Sn, Mo, Nd, Zr, and Zn; and wherein the primary precursor is represented by Formula 1 below:

$$M(OH_{1-z})_2 \quad (1)$$

wherein $0.4<z<1$; and M is $Ni_aMn_bMe_c$, wherein $a+b\le1$, $0.3\le a\le0.9$, $0.1\le b\le0.8$, and $0\le c\le0.2$; and Me is at least one element selected from the group consisting of Co, Al, Mg, Ti, Sr, Zn, B, Ca, Cr, Si, Ga, Sn, P, V, Sb, Nb, Ta, Mo, W, Zr, Y, and Fe.

2. The method according to claim 1, wherein the coating is performed such that the material is ionized in an aqueous acid solution, forming an intermediate, followed by reduction.

3. The method of claim 2, wherein the intermediate is a metal salt.

4. The method of claim 1, wherein the metal salt is a sulfate or a nitrate.

5. The method of claim 1, wherein the electrolytic decomposition is performed using a catalyst.

6. The method of claim 1, wherein the catalyst is at least one selected from the group consisting of a $ZnCl_2$-based catalyst, a $CoCl_2$-based catalyst, a $MnCl_2$-based catalyst, a $NiCl_2$-based catalyst, and a $SnCl_2$-based catalyst.

7. The method of claim 1, wherein Me comprises Co.

8. The method of claim 1, wherein the material has a coating thickness of 0.1 μm to 1 μm.

9. The method of claim 1, wherein an amount of the material is 0.01% to 5% based on a total weight of the precursor.

10. The method of claim 1, wherein the material is completely or partially coated on a surface of the primary precursor.

* * * * *